(12) United States Patent
Nicholas et al.

(10) Patent No.: US 9,110,698 B2
(45) Date of Patent: *Aug. 18, 2015

(54) CHANGING FREQUENCY OF A VIRTUAL PROGRAMMABLE INTERRUPT TIMER IN VIRTUAL MACHINES TO CONTROL VIRTUAL TIME

(71) Applicant: MICROSOFT TECHNOLOGY LICENSING, LLC, Redmond, WA (US)

(72) Inventors: Andrew Ernest Nicholas, Sunnyvale, CA (US); Rene Antonio Vega, Scotts Valley, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/020,209

(22) Filed: Sep. 6, 2013

(65) Prior Publication Data

US 2014/0007101 A1    Jan. 2, 2014

Related U.S. Application Data

(63) Continuation of application No. 11/197,614, filed on Aug. 4, 2005, now Pat. No. 8,533,709.

(51) Int. Cl.
*G06F 9/455* (2006.01)
*G06F 9/48* (2006.01)

(52) U.S. Cl.
CPC .......... *G06F 9/45533* (2013.01); *G06F 9/4825* (2013.01)

(58) Field of Classification Search
CPC combination set(s) only.
See application file for complete search history.

(56) References Cited

U.S. PATENT DOCUMENTS

| 4,772,966 A | 9/1988 | Sharples et al. |
|---|---|---|
| 6,212,574 B1 | 4/2001 | O'Rourke et al. |
| 7,647,062 B2 | 1/2010 | Makinen et al. |
| 8,533,709 B2 | 9/2013 | Nicholas et al. |
| 2003/0101440 A1 | 5/2003 | Hardin et al. |
| 2006/0090092 A1 | 4/2006 | Verhulst |

OTHER PUBLICATIONS

Cristian et al. "Clock Synchronization in the Presence of Omission and Performance Failures, and Processor Joins", IBM Research, 16th IEEE Int. Symp. On Fault-tolerant Computing Systems, Vienna, Jul. 1986.

(Continued)

*Primary Examiner* — Eric C Wai
(74) *Attorney, Agent, or Firm* — Sunah Lee; Kate Drakos; Micky Minhas

(57) ABSTRACT

A catch-up mode that runs a virtual programmable interrupt timer faster than a nominal rate to prevent time loss in a virtual machine can be implemented. If time loss is determined, a catch-up mode can be initiated to cause increased firings, beyond a nominal rate, of the programmable interrupt timer to adjust the clock of the virtual machine to the clock of the host system. The virtual programmable interrupt timer can also be readjusted to a predetermined nominal rate when the time loss in the guest operating system is determined approximately within a predetermined tolerance range. The catch-up mode can be monitored to avoid "interrupt storms" on the virtual machine. The virtual programmable interrupt timer can be altered by the guest operating system to accommodate different operating systems.

20 Claims, 5 Drawing Sheets

Virtual Machine Timer Sequence With Catch-Up Mode

(56) References Cited

OTHER PUBLICATIONS

Mock et al. "Continuous clock synchronization in wireless real-time applications", Reliable Distributed Systems, 2000, p. 125-132.

Honeycutt, J., "Microsoft® Virtual PC", Microsoft®, Nov. 2003, 1-27.

CHANGING FREQUENCY OF A VIRTUAL PROGRAMMABLE INTERRUPT TIMER IN VIRTUAL MACHINES TO CONTROL VIRTUAL TIME

CROSS REFERENCE TO RELATED CASES

This application is a continuation of U.S. patent application Ser. No. 11/197,614, filed on Aug. 4, 2005, now U.S. Pat. No. 8,533,709, issued on Sep. 10, 2013, the entirety which is incorporated herein by reference.

BACKGROUND

Some x86 guest operating systems (OS) implement periodic timing as the means to create a software stepping signal to update their time of day counters. These operating systems use the programmable interrupt timer to interrupt or fire at a predictable rate and update the operating system counter that is used to keep track of elapsed time. Time for an operating system can be maintained by a kernel clock and the time-of-day clock. The time-of-day clock is derived from the kernel clock unless the time-of-day clock is externally modified, for example, by a user. If for example, the time-of-day clock is externally modified, the kernel clock will not track the time-of-day clock, but will remain unchanged. A virtualization service creates a virtual programmable interrupt timer, one or more for each virtual machine, and the virtual programmable interrupt timer relies on a regular, periodic host operating system callback mechanism to accurately emulate the programmable interrupt timer for the virtual machines.

When the real programmable interrupt timer hardware is virtualized, the software virtualization is not in control of certain aspects of its operating environment. For example, the virtualization service implementing the virtual programmable interrupt timer may be preempted by other host activity causing the virtual system to have non-deterministic timing behavior. The virtual machines may also be preempted either by host activity or by other virtual machines executing in the same physical system. Consequently, there may be periods of time when a virtual programmable interrupt timer interrupt presented to the virtual machine may be delayed past the next expected timer period and effectively merged with the next virtual programmable interrupt timer interrupt. If this occurs, the virtual programmable interrupt timer may appear to "lose time" with respect to the actual time as the interrupt arrival rate becomes less than nominal The amount of time loss in the virtual programmable interrupt timer can range from a few seconds every minute with a light processor load on the host to a majority of the time every minute with heavy processor loads on the host machine. The greater the loss, the more problems the virtual machine will face in operation.

Several methods have been used in the past to keep more accurate time in a virtual machine. For example, Microsoft Virtual PC implemented a method that involved a guest operating system component periodically requesting the current time from the host and subsequently setting the correct externally visible time in the guest operating system. The guest operating system was informed by the host how often and whether or not to apply time correction along with the threshold of time-drift which should have a trigger setting a time correction.

For many aspects of x86 time-keeping, the Virtual PC method was functional, however it did have several significant deficiencies. Several types of guest operating system programs such as domain controllers were intolerant to having the external time inside the guest operating system suddenly "jump" forward when time was corrected. The guest operating system's time would "jump" forward when the operating system time-synchronization component realized that several seconds had been "lost" and would tell the guest operating system to advance the time. Also, the issue with time appearing to drift and run slower in the guest operating system was not addressed by this method.

In another method, the host operating system determines the location of the "clock" updated by the programmable interrupt timer interrupt handler in the guest operating system to prevent drifting. This method required intimate knowledge of the "clock" location in the guest memory for a specific guest operating system. This method, therefore, had to use an added guest component to discover the "clock" location to enlighten the guest operating system of the clock position. The location of the "clock" in the guest memory was then transmitted to the host so that the clock was updated directly. This method was also deficient because it required multiple changes to be made to the guest operating system. Further, the "clock" position varied in the different operating systems requiring additional components to be created for each operating system. This method would be highly unpractical today where there is a plurality of operating systems, in contrast to the past when there were only a few operating systems.

In yet another method, a component of the guest operating system was modified to request the precise elapsed time from the virtual machine. This method allowed enlightened guest operating systems to maintain precise, correct time. This method, however, required guest x86 operating systems to either request the correct time from the host or have the guest "advertise" the memory location of its operating system "clock." This method was deficient because it required additional code to inform the operating system of the location of the clock. Thus, this method, too, required modification of the guest operating system that would be unpractical today with the plurality of operating systems in use.

Moreover, a method was invented where the steering information from the guest operating system was communicated to the virtualization service. Specifically, the clock time inside the guest operating system was transmitted periodically to the virtualization service. This method allowed the virtual service to calculate the difference in clock time between the guest operating system and host operating system so that the clock could be updated. This method was also deficient because a small amount of time loss or drift remained even after correction by this method.

In view of the foregoing, there is a need to overcome the limitations, drawbacks, and deficiencies of the prior art.

SUMMARY

The following summary provides an overview of various aspects of the invention. It is not intended to provide an exhaustive description of all of the aspects of the invention, nor to define the scope of the invention. Rather, this summary is intended to serve as an introduction to the detailed description and figures that follow.

The accuracy of time as perceived by the guest virtual machine is significantly improved. An example method solves the problem of excessive time loss (drift) within a virtual machine (VM). The method adaptively corrects for time loss within a virtual machine and further uses a feedback mechanism to ensure that time correction is applied (e.g., only when necessary) to prevent interrupt storms. Portions of this method remain transparent to the guest operating system such as the programmable interrupt timer acceleration. Other aspects such as a feedback mechanism may use a software driver to the guest operating system.

A mechanism used by the virtualization service (VS) to correct for time drift involves running the guest virtual machine's programmable interrupt timer at a higher frequency than nominal when the VS detects that the guest has "lost" time. A programmable interrupt timer can be, for example, an HPET high precision event timer, a 8253 PIT, an RTC real time clock, an ACPI PM counter, or a local APIC timer. Running the programmable interrupt timer at a higher frequency than nominal causes timer interrupts to be delivered to the guest operating system at a faster rate than the guest operating system had requested.

The programmable interrupt timer interrupt rate can also be monitored and moderated to prevent an interrupt storm on the guest operating system. An interrupt can be a signal informing a program or operating system that an event has occurred. Interrupt signals can come from a variety of sources. For example, every keystroke generates an interrupt signal. Interrupts can also be generated by other devices, such as a printer, for example, to indicate that some event has occurred. These are called hardware interrupts. Interrupt signals initiated by programs are called software interrupts.

When a program receives an interrupt signal, it can take a specified action. Interrupt signals can cause a program to suspend itself temporarily to service the interrupt. If a plurality of interrupt signals are received by a program or operating system, the interrupts can cause a long suspension causing the program or operating system to cease functioning. Receipt of a plurality of interrupt signals ultimately causing a suspension of function may be referred to as an interrupt storm.

Monitoring and moderating the programmable interrupt timer interrupt rate can prevent a failure in the guest virtual machine to make forward progress. Further, an optional feedback mechanism can be used to help correct for time drift on the guest virtual machine.

The "lost" time budget can also be scaled appropriately whenever the guest virtual machine changes the programmable interrupt timer's period so that the time correction code continues to make up for lost time without introducing a discontinuity or inaccuracy.

Additional features and advantages will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The proper maintenance of the correct time in a guest operating system is a factor that can affect the performance of a virtual machine. Loss of time in a guest operating system can be detrimental to the virtual machine in several subtle ways. For example, watching a clock within the guest operating system while watching a similar clock in the host operating system may show time to be slowly losing several seconds of every minute. The guest operating system clock will appear to lag behind the host operating system clock. Apparent lags in time can be detrimental to programs and processes being performed in the guest operating system.

Additionally, timers, and services within the guest virtual machine which expect an absolute amount of time to elapse will not perceive the correct amount of time elapsing. For example, the scheduling of processes and threads by the guest operating system kernel scheduler lags real elapsed time on the host. If the guest slowdown is significant, time slicing of threads within a guest operating system is severely perturbed.

Mechanisms used by a virtual system to emulate the timer interrupts are not accurate due to various reasons. For example, time-slicing of the virtual processor may delay guest interrupts. Additionally, other host activity may delay the guest interrupts. Moreover, the precision of the timing facilities available to the virtual machine may not be high enough, thus delays in the guest interrupts may occur.

To address the time loss issue and the inaccuracies of the mechanisms used to emulate the timer interrupts, a more accurate time-keeping mechanism can be utilized. A "catch-up" mode that runs the virtual programmable interrupt timer faster than a nominal rate can be implemented. Nominal can be defined, for example, as the expected rate a guest operating system programs the programmable interrupt timer to fire. It is desirable to avoid running the catch-up mode too often, thereby avoiding an "interrupt storm" on the virtual machine where the guest operating system is incapable of making forward progress due to the large number of interrupt requests.

Exemplary Computing Environment

Figure 1:
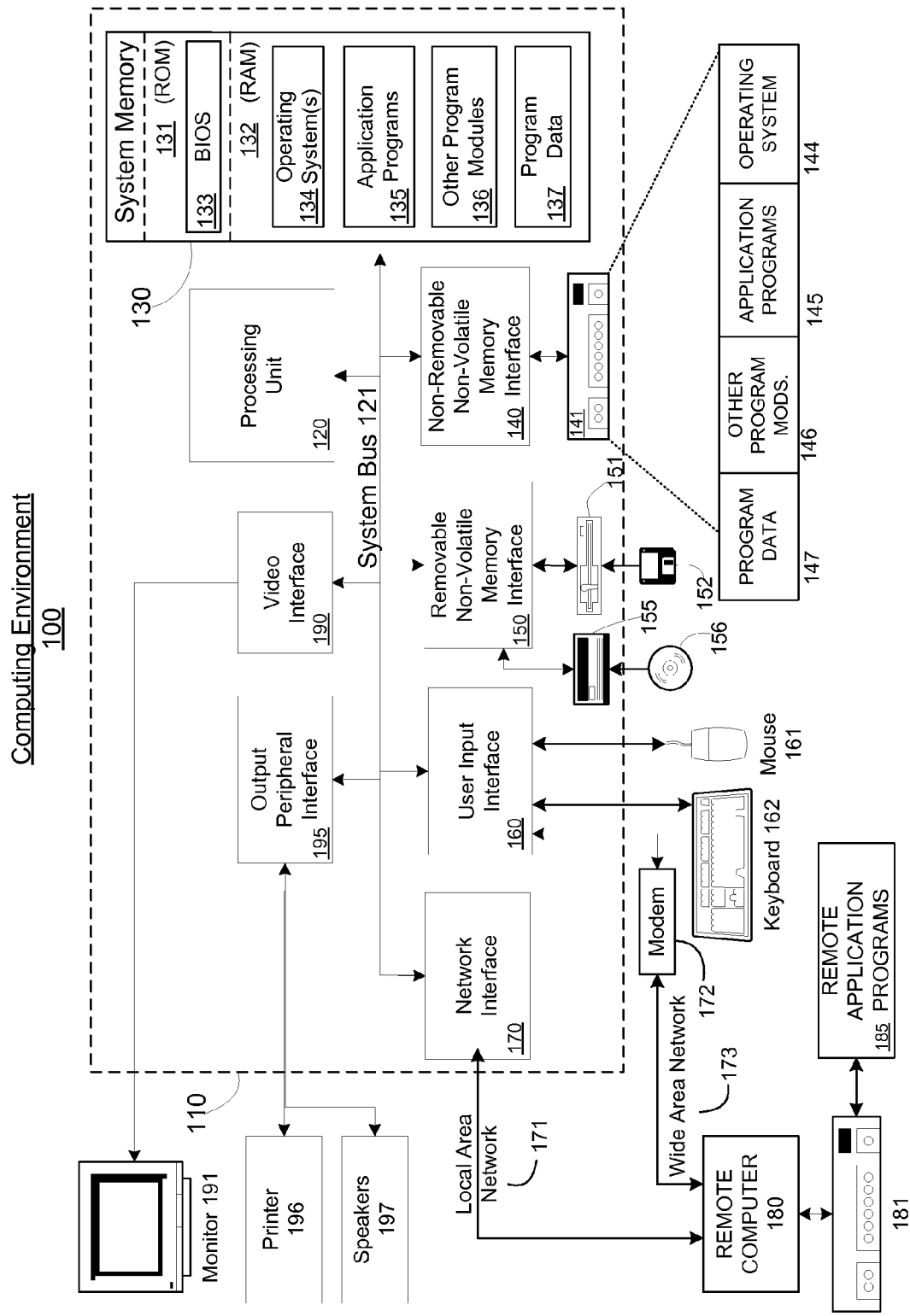
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface (wired or wireless) or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments

Figure 2:
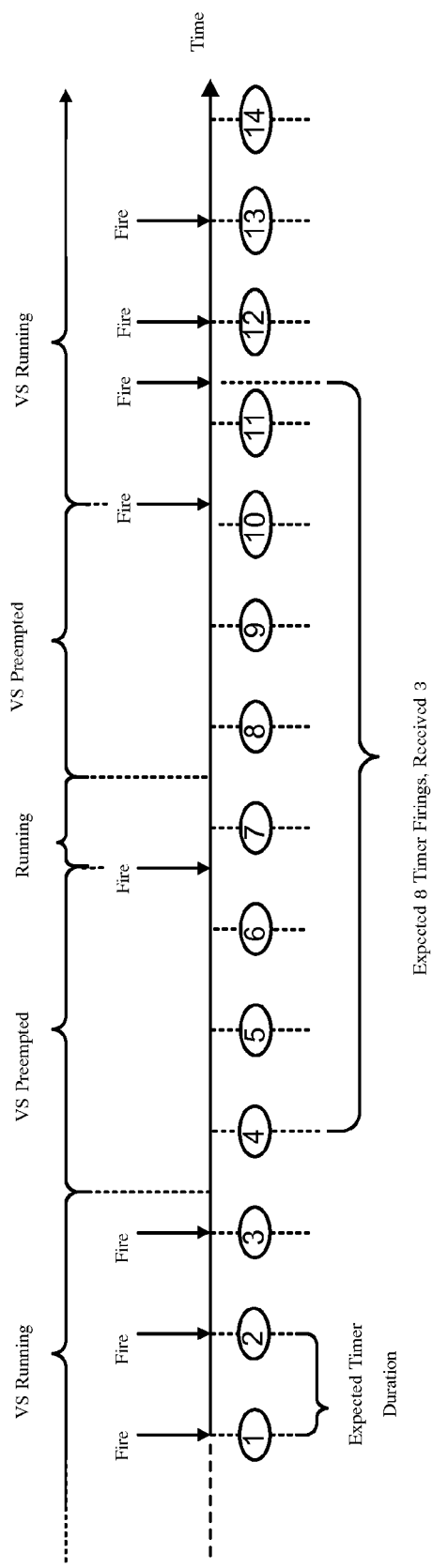
FIG. 2 is a diagram of an exemplary timeline useful for describing an example of loss of time in a virtual machine.

FIG. 2 illustrates how time loss may occur in a virtual machine. Initially, the expected timer durations are predetermined across the time spectrum and are labeled as 1-14. With the virtual system running without any interruptions or preemptions, the expected firings occur at expected firings 1-3 without causing time loss.

As illustrated in FIG. 2, the VM is preempted between expected firings 3 and 7 where only one (1) out of an expected three (3) firings occur. At that point in time, there is "time loss" because the guest operating system only shows, for example, 10 milliseconds having passed while, in reality, 30 milliseconds have passed.

Further interruptions or preemptions occur, as illustrated in FIG. 2, between expected firings 8-10 where no firings occur. The guest system, therefore, may be behind another 30 milliseconds because no firings occurred during the expected firing period. Over the course of time from expected firing 4 and through expected firing 11, only three (3) out of the expected eight (8) firings occur because of preemption, for example. The loss of the expected five firings can result in time loss in the guest virtual machine. If the timer duration is 10 milliseconds, for example, approximately 30 milliseconds will appear to elapse inside the guest virtual machine instead of the true 80 milliseconds. The time loss is undesirable.

Figure 3:
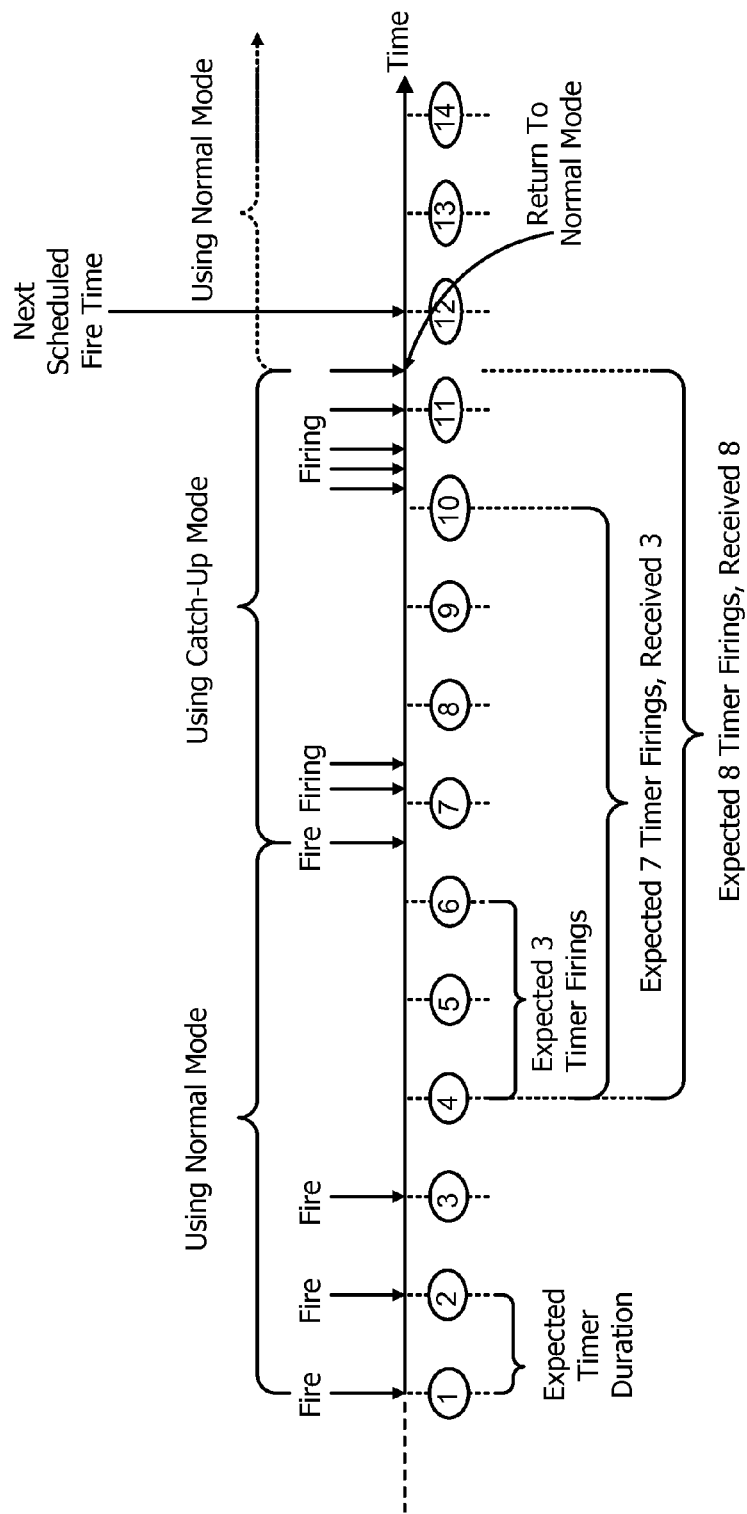
FIG. 3 is a diagram of an exemplary timeline useful for describing an exemplary process for correcting time in a virtual machine in accordance with the invention.

FIG. 3 illustrates a diagram useful for describing correcting time loss in a virtual machine in accordance with the invention. Initially, the expected timer durations are predetermined across the time spectrum and are labeled as 1-14. In a "normal mode" with no interruptions, the firings occur as expected at 1, 2, and 3, respectively.

In between expected firing 4 and expected firing 6, however, the firings are delayed or interrupted and none of the expected firings occur during that time. Because there is a delay in the firings, a catch-up mode is initialized and firings start to occur at an increased rate as shown between expected firing 6 and expected firing 11.

Once the actual firings equal or fall within a predetermined tolerance with the expected firings during the time loss period, the system can shift back to normal mode as shown between expected firing 11 and expected firing 12. The system then reverts back to firing only at the expected times. If, however, there is another loss of time because of an interrupt, a catch-up mode can again be initialized to keep the guest operating system time within tolerance.

A catch-up mode can be entered independently from a guest operating system or it can be optionally augmented with additional data from the guest, for example. Specifically, the guest operating system can periodically provide feedback data on how much time loss occurred over a predetermined time and can cause the time-keeping state machine to enter or exit a catch-up mode. The guest operating system can provide what it believes is the current time to the virtualization service on the host operating system. The host operating system can then take the guest time and compare it with the actual time and determine the difference in times for the operating systems. This difference in time, or $\Delta T$, can be calculated by the host operating system and sent specifically to the programmable interrupt timer to cause the programmable interrupt timer into catch-up mode if the $\Delta T$ falls outside a predetermined tolerance range. The feedback data can help to alleviate the number of occurrences when the guest operating system desirably enters a catch-up mode to ratchet the guest external time forward and potentially disturb a time-sensitive service, for example a domain controller. The feedback data can also correct for minor time losses that may have occurred in the guest operating system.

The time correction code and the code used to determine the amount of time to run the virtual processor of the guest virtual machine desirably cooperate and interact with each other. Their cooperation greatly reduces the amount of waiting time which can take place in order to process high-resolution timers.

Figure 4:
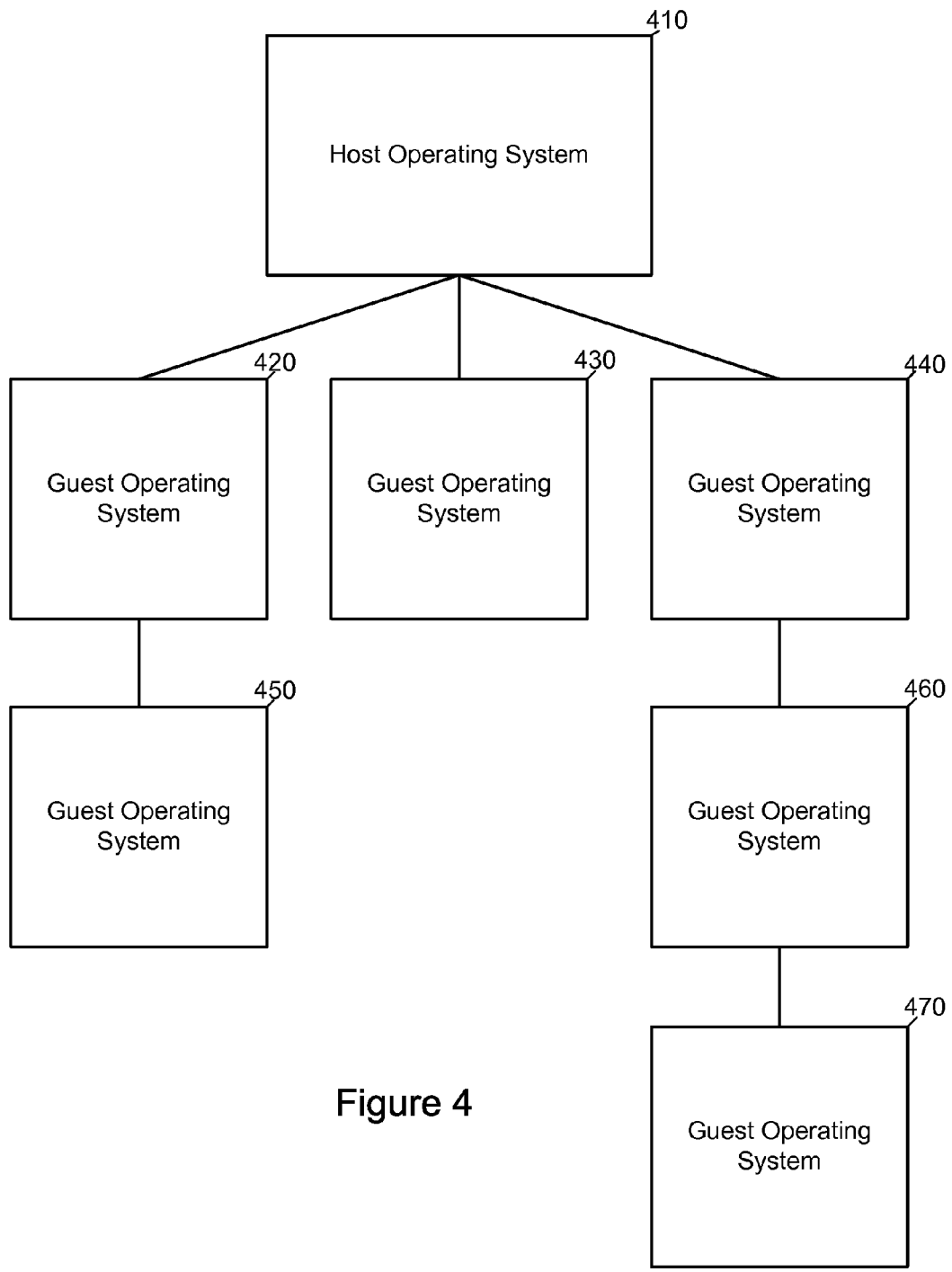
FIG. 4 is a block diagram illustrating an example host/guest operating system hierarchy in accordance with the invention.

While the methods described above reference interactions between a host operating system and a guest operating system, the methods described herein are not limited for use to only two systems. For example, FIG. 4 illustrates a host/guest operating system hierarchy in accordance with the invention. A traditional host operating system 410 is shown along with guest operating systems 420-440. There may, however, be multiple levels or layers of subsystems as shown in FIG. 4. For example, 450 can be a guest operating system of the guest operating system 420 that, in turn, is a guest operating system of the host operating system 410. Further, 470 is a guest operating system on the guest operating system 460 that is a guest operating system on the guest operating system 440 that is a guest operating system on the host operating system 410.

As illustrated in FIG. 4, for example, a guest operating system may be a host operating system to a lower level guest operating system. The exemplary methods described herein can be used at any level of a host/guest hierarchy for preventing time loss on the guest system.

Figure 5:
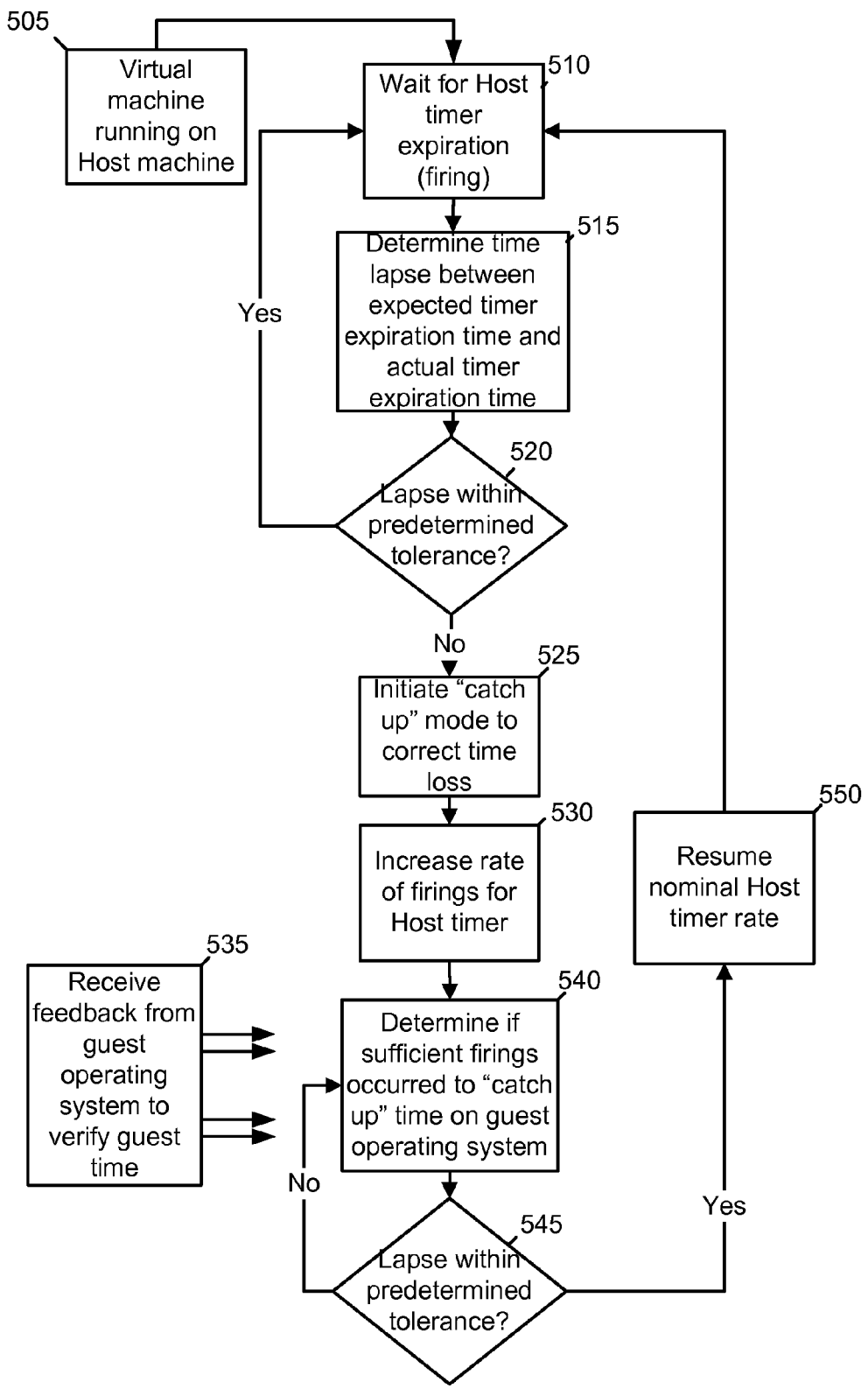
FIG. 5 is a flow diagram depicting an exemplary method for correcting time drift in accordance with the invention.

FIG. 5 illustrates an exemplary method for detecting and correcting time loss in a virtual machine in accordance with the invention. Initially, the virtual machine is running on a host machine at step 505. The virtual machine waits for the host timer expiration or firing at step 510.

Once the host timer expires, the virtual machine can determine the time lapse between the expected timer expiration time and the actual timer expiration time at step 515. If the lapse is within a predetermined tolerance at step 520, then the virtual machine can again wait for the next host timer expiration or firing at step 510. If, however, the lapse is not within the predetermined tolerance at step 520, then the virtual machine can initiate "catch-up" mode to correct the time loss at step 525. The predetermined tolerance at step 520 can be a 5 second time lapse, for example.

The rate of fire for the host time can be increased at step 530 and after a predetermined time, the virtual machine can then assess if there were sufficient firings of the host time to catch up or adjust the time of the guest operating system with the time of the host operating system at step 540. In performing this function, a feedback mechanism can be used to further verify the guest time at step 535.

If the time lapse now is within a predetermined tolerance at step 545, the virtual machine can then resume a nominal host timer expiration rate or firing at step 550 and wait for the host expiration timer to expire at step 510. If, however, the lapse is still not within a predetermined tolerance at step 545, a catch-up mode can continue and further determinations can be performed to determine if the time of the guest operating system is within a predetermined tolerance of the host operating system at steps 540-545. The predetermined tolerance at step 545 can be a 1 second time lapse, for example.

Additionally, a fail safe mechanism can be implemented to prevent further firings in catch-up mode if it is determined that the guest operating system will cause interrupt storms or will never catch up with the host operating system time. The fail safe mechanism may initiate if, for example, the time lapse is greater than 30 seconds.

The period of the guest programmable interrupt timer can also be changed by the guest operating system to accommodate different operating systems. For example, in the Microsoft Windows XP operating system, the period of the guest programmable interrupt timer may be 1 or 10 milliseconds, for example. A 1 millisecond duration, for example, may be used for multimedia timing such as sound or video applications. The time correction algorithms compensate for the dynamic nature of the programmable interrupt timer duration by scaling the number of timer-firings expected and timer-firings succeeded at the moment that the programmable interrupt timer duration is changed.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the versioning functionality of the present invention.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A method for controlling time loss within a virtual machine operating on a computing device, comprising:

detecting a time loss in an operating system executing on the virtual machine, when an expected timer expiration time of the virtual machine and an actual timer expiration time of the computing device is outside of a predetermined tolerance range;

adjusting a virtual programmable interrupt timer responsive to the time loss to operate at a rate greater than a nominal rate; and returning the rate of the virtual programmable interrupt timer to the nominal rate when a time difference between the operating system time and a time of the computing device is determined to be within the predetermined tolerance range.

2. The method as recited in claim 1 further comprising receiving the operating system time from the operating system.

3. The method as recited in claim 1 wherein the time of the computing device is based at least in part on a host operating system.

4. The method as recited in claim 1 comprising monitoring the virtual programmable interrupt timer to prevent a number interrupt signals from exceeding a number of signals that could result in a suspension of a program.

5. The method as recited in claim 1 comprising receiving from the operating system information indicative of time in the guest operating system.

6. The method as recited in claim 5 wherein the detecting of the time loss in the operating system is based at least in part on the information indicative of time in the guest operating system.

7. The method as recited in claim 1 wherein the nominal rate is based at least in part on a type of operating system.

8. A system comprising:

a computing device;

at least one memory in communication with said computing device when the system is operational;

instructions stored in said at least one memory that upon execution by said computing device at least cause:

a programmable interrupt timer to operate within a virtual machine at a predetermined frequency used by an operating system executing on the virtual machine to keep time;

a determination that a time lapse between an expected timer expiration time of the virtual machine and an actual timer expiration time of a host operating system is outside a predetermined tolerance range;

a temporary increase in the frequency of the programmable interrupt timer to adjust time in said operating system caused by an interruption in the virtual machine execution which resulted in the time lapse; and a return of the frequency of the programmable interrupt timer to the predetermined frequency when the time lapse in the operating system is determined to be approximately within the predetermined tolerance range.

9. The system as recited in claim 8 wherein the operating system time is received from the operating system.

10. The system as recited in claim 8 wherein the time of the computing device is based at least in part on a host operating system.

11. The system as recited in claim 8 wherein the instructions stored in said at least one memory that upon execution by said computing device at least cause the system to monitor the virtual programmable interrupt timer to prevent a number interrupt signals from exceeding a number of signals that could result in a suspension of a program.

12. The system as recited in claim 8 wherein the instructions stored in said at least one memory that upon execution by said computing device further comprise instructions for receiving from the operating system information indicative of time in the guest operating system.

13. The system as recited in claim 12 wherein the instructions stored in said at least one memory that upon execution by said computing device at least cause a determination that a time lapse between an expected timer expiration time of the virtual machine and an actual timer expiration time of a host operating system is outside a predetermined tolerance range is based at least in part on the information indicative of time in the guest operating system.

14. The system as recited in claim 8 wherein the nominal rate is based at least in part on a type of operating system.

15. A computer-readable storage memory in communication having stored therein computer-readable instructions that upon execution on a computing device at least cause:
- a programmable interrupt timer to operate within a virtual machine at a predetermined frequency used by a guest operating system executing on the virtual machine to keep time;
- a determination that a time lapse between an expected timer expiration time of the virtual machine and an actual timer expiration time of a host operating system is outside a predetermined tolerance range;
- a temporary increase in the frequency of interrupts from the programmable interrupt timer to adjust time in said guest operating system caused by an interruption in the virtual machine execution which resulted in the time lapse; and
- a return of the frequency of the programmable interrupt timer to the predetermined frequency when the time lapse in the guest operating system is determined to be approximately within the predetermined tolerance range.

16. The computer-readable storage memory as recited in claim 15 wherein the guest operating system time is received from the operating system.

17. The computer-readable storage memory as recited in claim 15 wherein the time of the computing device is based at least in part on a host operating system.

18. The computer-readable storage memory as recited in claim 15 wherein the instructions stored in said at least one memory that upon execution by said computing device at least cause the system to monitor the virtual programmable interrupt timer to prevent a number interrupt signals from exceeding a number of signals that could result in a suspension of a program.

19. The computer-readable storage memory as recited in claim 15 wherein the instructions stored in said at least one memory that upon execution by said computing device further comprise instructions for receiving from the operating system information indicative of time in the guest operating system.

20. The computer-readable storage memory as recited in claim 19 wherein the instructions stored in said at least one memory that upon execution by said computing device at least cause a determination that a time lapse between an expected timer expiration time of the virtual machine and an actual timer expiration time of a host operating system is outside a predetermined tolerance range is based at least in part on the information indicative of time in the guest operating system.

* * * * *